(No Model.) 2 Sheets—Sheet 1.
J. RODES.
CAMERA TRIPOD.
No. 487,295. Patented Dec. 6, 1892.
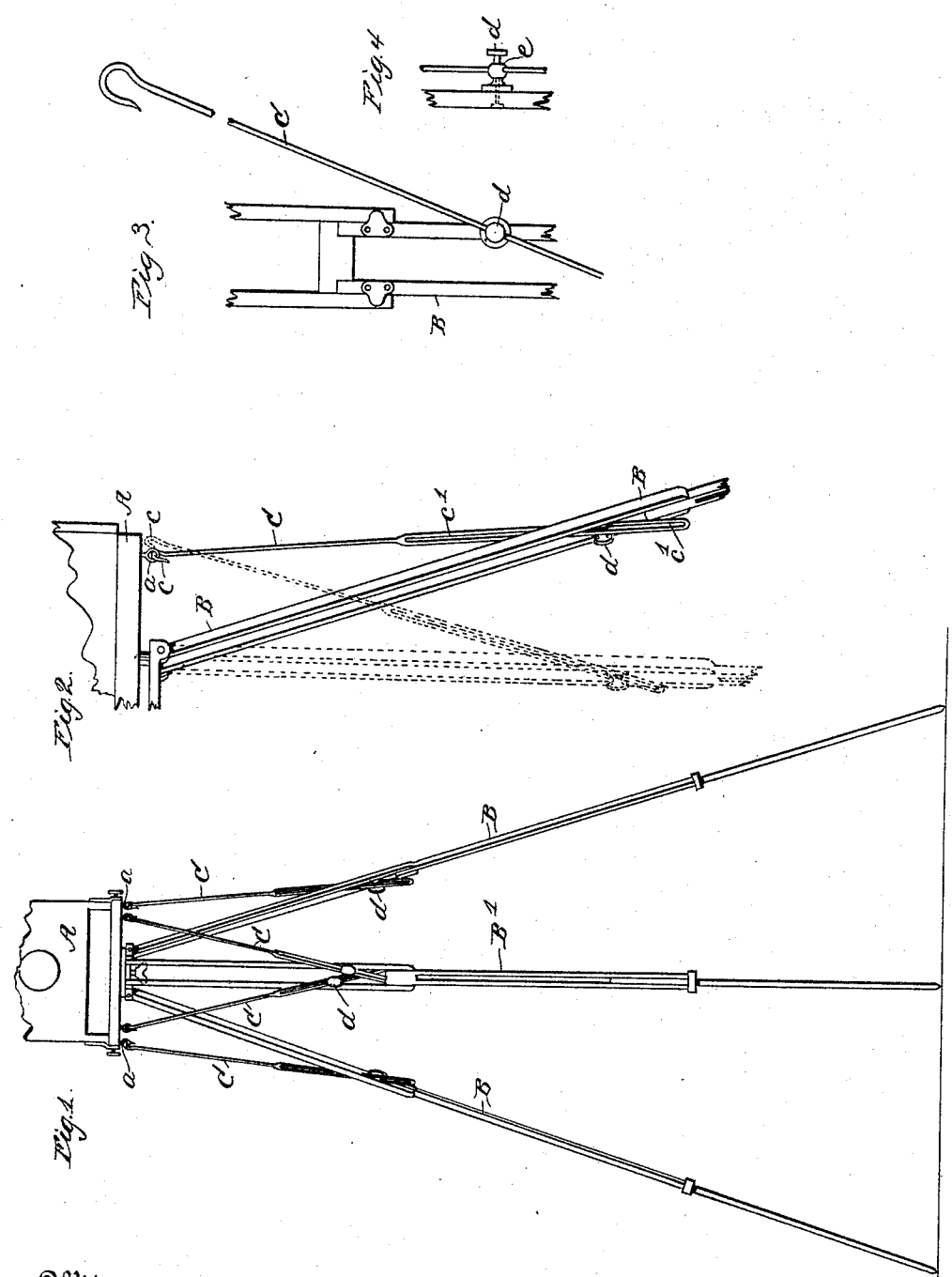
Witnesses
O. T. Wilson
Frito F. Kemper
Inventor
Joseph Rodes
By his Attorneys
Gifford & Saw (No Model.) 2 Sheets—Sheet 2.

J. RODES.
CAMERA TRIPOD.

No. 487,295. Patented Dec. 6, 1892.

Witnesses
V. T. Wilson.
Fred S. Kemper.

Inventor
Joseph Rodes
By his Attorneys
Gifford & Law

United States Patent Office.

JOSEPH RODES, OF SAN DIEGO, CALIFORNIA.

CAMERA-TRIPOD.

SPECIFICATION forming part of Letters Patent No. 487,295, dated December 6, 1892.

Application filed February 27, 1892. Serial No. 423,022. (No model.)

*To all whom it may concern:*

Be it known that I, JOSEPH RODES, of San Diego, county of San Diego, State of California, have invented a new and useful Improvement in Camera-Tripods, of which the following is a specification, reference being had to the accompanying drawings.

My improvement refers to the tripod by which the camera is supported when in use; and it consists in a device for bracing and steadying the tripod and camera, by which the latter is rendered firm and rigid and all slipping or accidental movement of the tripod while the plate is exposed is prevented.

Figure 5:
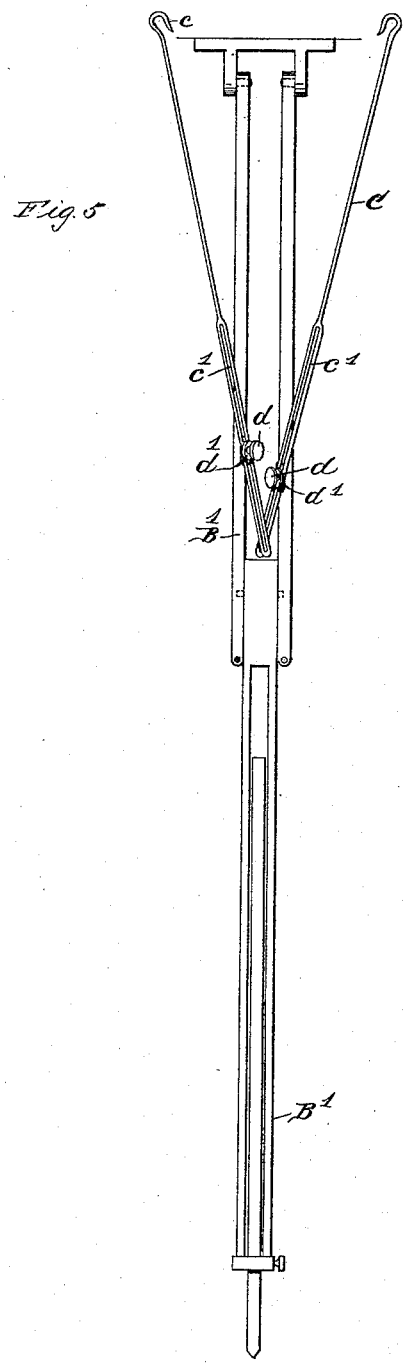

In the drawings, Figure 1 is an elevation of the tripod extended. Fig. 2 is a detail view of a part of the tripod. Fig. 3 is a view of a modification. Fig. 4 is a view of the clamp shown in Fig. 3. Fig. 5 is a detail, and Fig. 6 is a view, of the tripod folded.

My improvement consists, essentially, in a movable brace extending from each corner of the camera to the legs of the tripod, so constructed and arranged that it can be adjusted to accommodate any extension or position of the legs and can be folded up compactly with the tripod when the latter is not in use.

In the drawings, A is the camera, B B' the legs of the tripod, and C C are the braces. These braces are constructed of metal, as steel, so as to have some spring, and are provided at one end with the hooks $c$, by which they are connected to the camera-frame by means of the eyes $a$ and have at the other end the slots $c'$, through which they are fastened to the tripod by the thumb-screws $d$.

Figure 6:
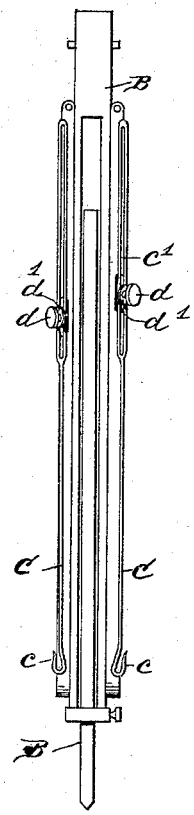

In the form of tripod shown in Figs. 1, 2, 5, and 6 the braces are secured to the inner side of the tripod-sections, as will be seen from the drawings, and the thumb-screws are thus turned inward and are out of the way and not liable to catch in anything. On the screw $d$ on the outside of the braces are washers or loose plates $d'$, which assist the screws in holding the braces tightly against the tripod. The hooks $c$ are so formed on the rod or braces that they can be hooked into the eyes $a$ only when the leg of the tripod is perpendicular to the base of the camera, as indicated in dotted lines in Fig. 2, and before the leg is extended, in order that when the leg is extended, as shown in full lines, the hook cannot by any accident drop out of the eye and become detached from the camera. The slots $c'$ in the braces allow the braces to accommodate themselves to any position or extension of the legs of the tripod, the brace readily sliding on the thumb-screw $d$ as the leg is moved and, moreover, allow the braces to be arranged alongside of the tripod when the latter is folded, as shown in Fig. 6.

The mode of using my improvement is as follows: After the tripod is put together and drawn out or arranged to support the camera and the camera is attached to the plate or top of the same and before the legs of the tripod are extended the hooks $c$ are inserted into the eyes $a$ at the corners of the camera or camera-frame, the thumb-screws $d$ having been previously loosened, so that the braces can readily move or slide out to the camera. As there are four braces—one from each corner of the camera—and the tripod has three legs, one of the legs, as B', known as the "front" leg and which is always in line with the lens in the camera, has two braces reaching from the front corners of the camera, the other legs each having a single brace from one of the back corners. The camera having been thus connected with the tripod, the legs of the tripod are then extended in the position desired to support the camera, and the braces on the front leg B' are fastened by screwing the thumb-screws $d$ until the lower end of the braces are tightly secured to the leg of the tripod. A slight pressure is then brought to bear on the back of the camera to tighten the front braces and to slide the back braces down as far as possible on the thumb-screws, when these back braces are fastened to the back legs of the tripod by the thumb-screws in the manner described, and the camera and tripod will be securely and firmly braced and connected together, so that any further extension or slipping of the legs of the tripod or any movement of the camera on the tripod is effectually prevented, and the tripod and camera may be swung around on the front leg or may be lifted up and carried about from place to place, with the legs held extended in the same position, without requiring readjustment.

With some varieties of tripods, where all the sections slide into each other, it will be impossible to place the fastening $d$ for the braces on the inside of the sections; but in such constructions fastenings can be placed on the outside edge of the tripod, as is shown in Fig. 3.

In place of the form of brace shown in Figs. 1, 2, 5, and 6, with the slots $c'$, the lower part of the brace may be simply a straight rod, as shown in Figs 3 and 4. With this form of brace the fastening device on the tripod may consist of a swivel $e$, screwed to the leg of the tripod, so as to turn and accommodate itself to the movement of the brace and having a hole through which the brace can pass and in which it is securely fastened or held by the thumb-screw $d$, as is shown in Fig. 4. My improved brace thus secures the camera more effectually to the tripod and assists in supporting the same on the latter and fastens the legs of the tripod apart, so they cannot slip or move and steadies the whole apparatus, rendering it firm and rigid and preventing any accidental movement of either the tripod or camera, and the braces are easily and quickly adjusted and fold up compactly with the tripod in transportation.

The brace may be applied to any form of tripod, and I do not wish to confine myself to the exact construction herein shown, as the construction and arrangement may be varied to suit other forms of tripods and camera-frames.

What I claim is—

1. In a photographic apparatus, in combination, a camera, a tripod supporting the same, and braces extending from the camera to the legs of the tripod, whereby the camera and tripod are braced and steadied with reference to each other, substantially as described.

2. In a photographic apparatus, in combination, a camera, a folding tripod supporting the same, braces extending from the camera to the tripod, and means whereby the braces are adjustably secured to the tripod, substantially as described.

3. In a photographic apparatus, in combination, the camera A, folding tripod B B', and braces C, having the hooks $c$, whereby they are attached to the camera, and the slots $c'$, by which they are adjustably secured to the tripod by the screws $d$, substantially as described.

JOSEPH RODES.

Witnesses:
J. WILLIAMS KEENAN,
R. LECAIRÉ FOSTER.